(12) United States Patent
Park

(10) Patent No.: US 7,373,949 B2
(45) Date of Patent: May 20, 2008

(54) FLUID TREATMENT SYSTEM

(75) Inventor: Stuart Park, Chardon, OH (US)

(73) Assignee: Kinetico Incorporated, Newbury, OH (US)

( * ) Notice: Subject to any disclaimer, the term of this patent is extended or adjusted under 35 U.S.C. 154(b) by 103 days.

(21) Appl. No.: 10/525,542

(22) PCT Filed: Aug. 22, 2003

(86) PCT No.: PCT/US03/26456

§ 371 (c)(1),
(2), (4) Date: Feb. 16, 2006

(87) PCT Pub. No.: WO2004/020340

PCT Pub. Date: Mar. 11, 2004

(65) Prior Publication Data

US 2006/0118182 A1    Jun. 8, 2006

(51) Int. Cl.
*B01D 17/12* (2006.01)
*F17D 3/00* (2006.01)

(52) U.S. Cl. .......................... 137/624.18; 137/624.14; 210/98; 210/190

(58) Field of Classification Search ........... 137/624.18, 137/624.14, 624.12; 210/98, 190, 88, 26
See application file for complete search history.

(56) References Cited

U.S. PATENT DOCUMENTS

| | | | |
|---|---|---|---|
| 4,298,025 A | 11/1981 | Prior et al. | |
| 4,427,549 A | 1/1984 | Brown et al. | |
| 5,022,994 A * | 6/1991 | Avery et al. | 137/624.12 |
| 5,375,768 A | 12/1994 | Clark | |
| 5,490,932 A | 2/1996 | Hansen et al. | |
| 6,287,457 B1 * | 9/2001 | Van De Moortele | 137/624.18 |

* cited by examiner

*Primary Examiner*—Kevin Lee
(74) *Attorney, Agent, or Firm*—Tarolli, Sundheim, Covell & Tummino, LLP

(57) ABSTRACT

A control valve for a water treatment system which includes a turbine (110) rotatably mounted within a water receiving chamber. A nozzle assembly (122) defines first and second fluid paths, one of the flow paths may include a fluid pressure response valve element (320) for controlling fluid flow along the one path. The system also comprises a nozzle assembly (122') defining a throat (302') extending from an inlet and terminating in a arcuate outlet conforming to the periphery of the turbine. A plurality of spaced apart and angled vanes (404) are disposed in the throat.

24 Claims, 11 Drawing Sheets

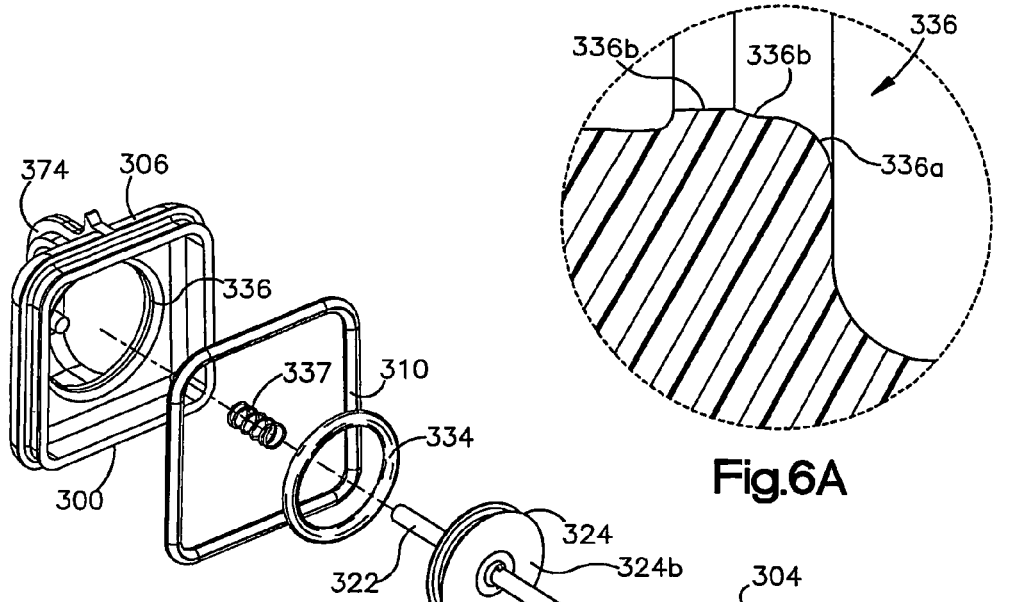
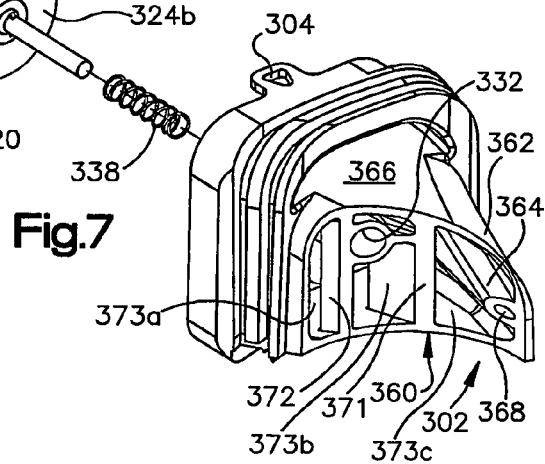
Fig.6A
Fig.7
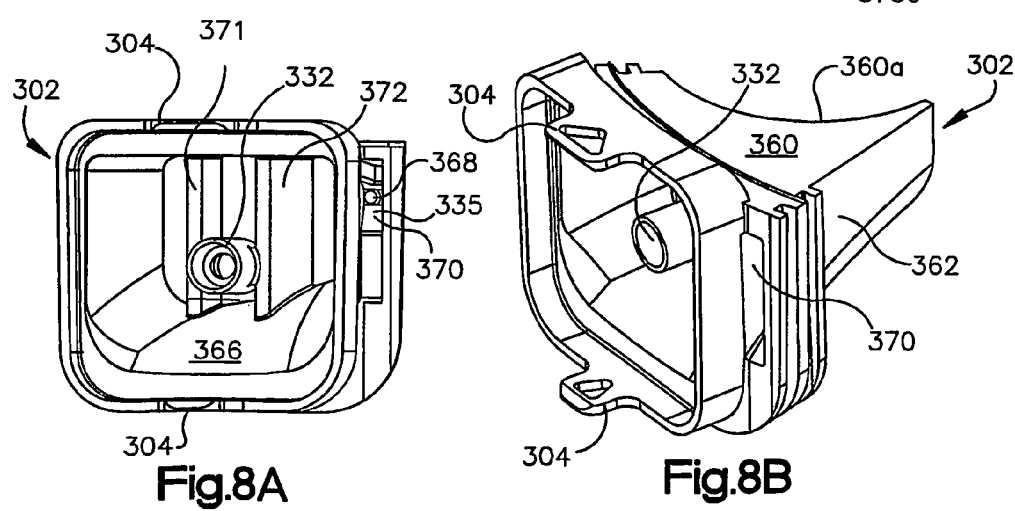
Fig.8A
Fig.8B

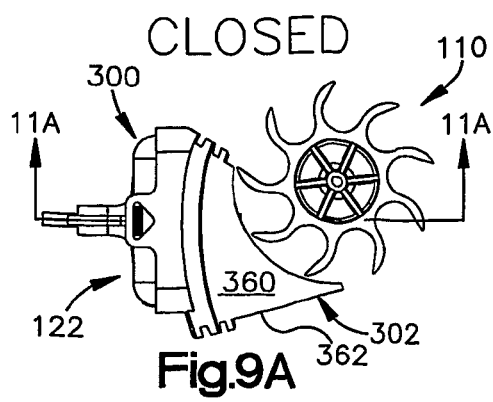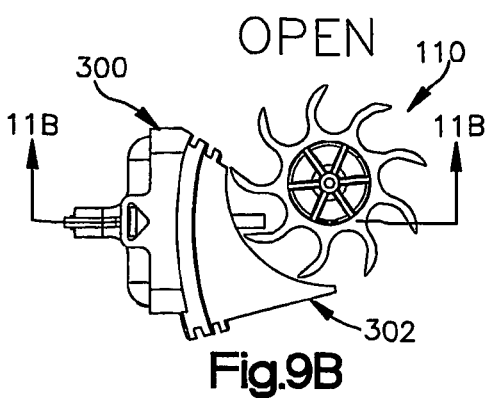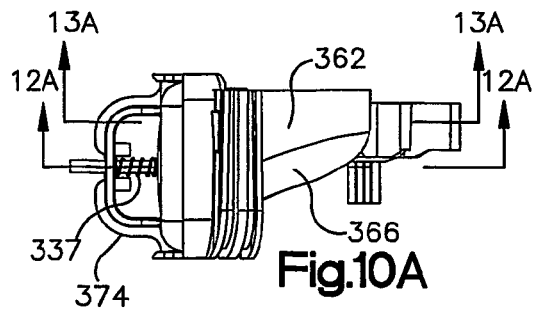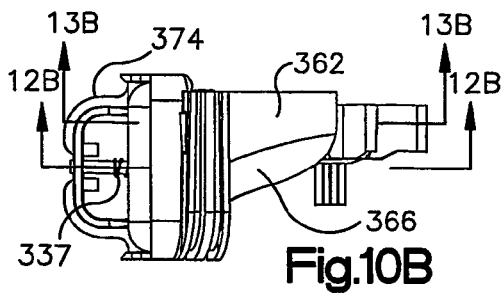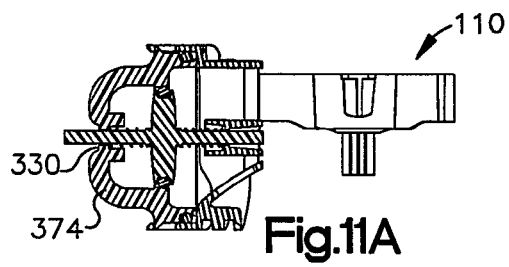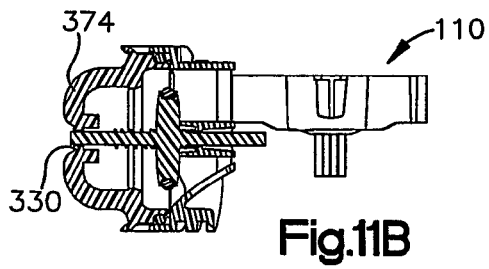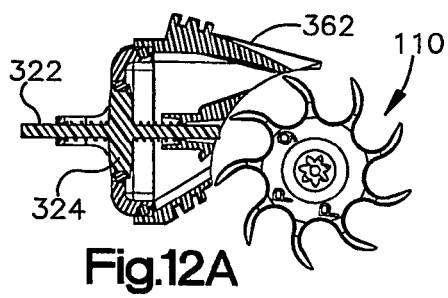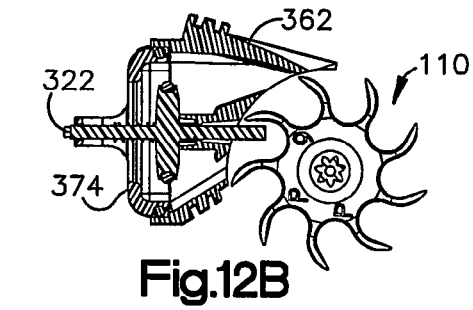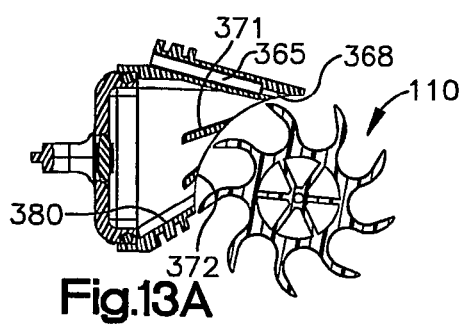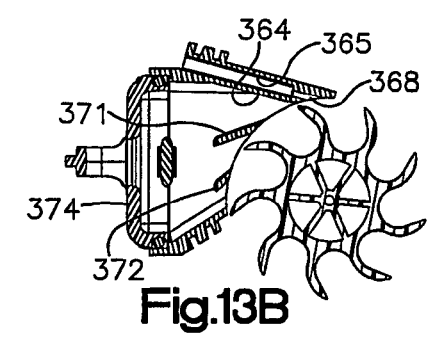

FLUID TREATMENT SYSTEM

TECHNICAL FIELD

The present invention relates generally to fluid treatment and in particular to an improved control system and control device for controlling a fluid treatment apparatus.

BACKGROUND ART

U.S. Pat. No. 4,298,025, which is owned by the present assignee, discloses a control valve for use in water softeners having two resin tanks. One of the resin tanks is normally on-line while the other tank is regenerated and placed in a standby condition until the first tank requires regeneration. The disclosed control valve controls which of the tanks is on-line and controls the regeneration sequence of an exhausted tank.

The quantity of water treated by a given tank, is monitored by a mechanism that includes a water usage turbine driven by water entering the on-line resin tank. When a predetermined quantity of water is treated, which produces to a predetermined number of revolutions in the turbine, a regeneration sequence is initiated which places the standby tank on-line and isolates the exhausted tank.

A second turbine, operatively connected to a regeneration sequence control element (in the form of a disk) is rotated by a stream of water that is activated at the beginning of the regeneration cycle. The stream of water physically drives the regeneration control disk (via the turbine and associated drive train) through its sequence. With the disclosed arrangement, the frequency of regeneration of the water softener system is determined by the usage turbine which directly measures the quantity of fluid treated by a given tank.

In U.S. Pat. No. 4,427,549 which is also owned by the present assignee, a deionization method and apparatus is disclosed. The disclosed apparatus includes a control valve similar to the control valve disclosed in U.S. Pat. No. 4,298,025 in that it includes a usage turbine for monitoring the amount of source water treated by a given tank and a regeneration control turbine for driving a control element through a regeneration sequence.

The control valves disclosed in U.S. Pat. Nos. 4,298,025 and 4,427,549 channel all water to be treated past the water usage turbine. For the valves disclosed in these patents, the flow rate is sustainable through the valve is in large measure determined by the flow rate that is sustainable through the passages conveying the water to the water usage turbine. Attempts have been made to improve the flow rate of the types of control valves disclosed in the above-identified patents.

U.S. Pat. No. 5,490,932, which is also owned by the present assignee and is hereby incorporated by reference, discloses a dual nozzle arrangement which increases the maximum flow rate through the valve of the water to be treated. In the control valve disclosed in the patent, two nozzles simultaneously feed water to the usage turbine.

It has been found that in some water treatment applications, the flow rate of water through the valve can vary substantially. It has been found, for example, that in some systems the flow rate can vary between 0.05 gallons per minute to 30 gallons per minute. It has been found that in water treatment applications where water flow rates vary between extremely wide limits, the accuracy of the monitoring mechanism may be adversely affected. For example, at very low flow rates of fluid, as might occur due to leaks in the plumbing system, little or no rotation in the water usage turbine is produced. Hence, this leakage water, although treated by the treatment apparatus, i.e., water softener, would not produce proportional movement in the monitoring mechanism and, as a result, the online resin tank could be used beyond exhaustion before it is regenerated.

The monitoring inaccuracy caused by low water flow rates was also found to be present in plumbing systems that utilize storage tanks from which the treated water was called for as needed. In these types of systems, water delivered from the storage tank to a shower or washing machine was delivered at a relatively high flow rate. However, as the storage tank was refilled or replenished, the flow rate of the water refilling the tank gradually decreased as the tank level control valve neared closure. In some systems, the level control valve would allow water to "dribble" into the tank for a considerable amount of time before complete closure occurred. The water treatment apparatus, i.e., water softener, is usually located upstream of the storage tank. The relatively low water flow rate of the replenishment water passing through the water softener in some instances was not sufficient to produce proportional movement in the water monitoring mechanism, resulting in a treatment tank being left online beyond exhaustion.

DISCLOSURE OF INVENTION

The present invention provides a new and improved control valve for controlling a fluid treatment apparatus such as a deionization system or a water softener. In the illustrated embodiment, the improved control valve is used to control a fluid treatment system having a pair of treatment tanks, one of which is on-line, while the other is regenerated and held in a standby condition. The disclosed control valve, although similar to the control valves described in U.S. Pat. Nos. 4,298,025 and 4,427,549, which are hereby incorporated by reference, includes an improvement which enables it to monitor a wide range of water flow rates through the valve as compared to prior art valves of this type.

According to the invention, the control valve includes a water usage turbine rotatably mounted within a turbine chamber. Preferably the turbine chamber communicates with an outlet of the control valve. The turbine includes a plurality of vanes. A nozzle assembly having first and second fluid flow paths is located within the control valve.

The fluid flow paths are both configured to direct water into an impinging relationship with blades of a usage monitoring turbine located within a water collection chamber. At least one of the flow paths includes a fixed orifice in communication with an outlet chamber where treated water is delivered. The other flow path includes a fluid pressure responsive element that controls fluid flow along the path. When treated water is called for, the treated water must flow from the outlet chamber into the collection chamber via the nozzle assembly and turbine. In this way, the quantity of treated water delivered to a control valve outlet is monitored.

Treated water delivered at a relatively low flow rate is transferred from the outlet chamber to the collection chamber via the fixed orifice. According to the invention, the fixed orifice converts the fluid flow along the first fluid path into a high velocity stream which impinges against the turbine blades, thus producing rotation. In prior art valves relatively low flow rates could produce little or no rotation in the turbine blades.

As the demand for treated water increases, the flow rate through the nozzle increases applying opening pressures to the pressure responsive valve element forming part of the second flow path. When a threshold flow rate is exceeded, sufficient fluid pressure is generated on the valve component causing it to open, thus allowing treated water to flow along the second flow path. The second flow path can sustain a much higher flow rate and also channels the water towards the turbine blades, thus producing rotation in the turbine.

The pressure responsive valve element comprises a poppet piston biased towards a seat by a biasing spring. When sufficient force is applied to an upstream, pressure effective area on the poppet piston, it generates an opening force that overcomes the biasing force applied by the spring enabling the poppet piston to disengage its associated seat.

According to a feature of the invention, the poppet piston can move "over center" to allow reverse flow through the nozzle. Reverse flow of water, i.e., from the collection chamber to the outlet chamber, could occur due to back pressure surges or "hammering" as well as improperly connected plumbing lines. To achieve this feature, the poppet piston is sized and configured to pass through its associated seat should sufficient fluid forces be applied to a downstream side of a piston face. A tail spring which produces negligible forces on the piston when it is in its seat engaging position is configured to produce forces tending to return the poppet piston to its seat engaging position when it moves "over center."

A fuller understanding will be obtained and additional features of the invention will become apparent in reading the following detailed description made in connection with the accompanying drawings.

BRIEF DESCRIPTION OF THE DRAWINGS

FIG. 6A is an enlarged view of a portion of a nozzle indicated by the phantom circle in FIG. 6;

FIG. 7 is an exploded view of a nozzle assembly forming part of the present invention;

FIG. 8A is an end view of a throat portion of a nozzle assembly forming part of the present invention;

FIG. 8B is a perspective view of the throat portion shown in FIG. 8A;

FIGS. 9A and 9B are top elevational views of a nozzle assembly constructed in accordance with the preferred embodiment of the invention with a pressure responsive valve element shown in a closed and opened position, respectively;

FIGS. 10A and 10B are side elevational views of the nozzle assembly shown in FIGS. 9A, 9B, respectively;

FIGS. 11A and 11B are cross-sectional views as seen from the planes indicated by the lines 11a-11a in FIG. 9A and 11b-11b in FIG. 9B, respectively;

FIGS. 12A and 12B are sectional views as seen from the planes indicated by the lines 12a-12a in FIGS. 10A and 12b-12b in FIG. 10B, respectively;

FIGS. 13A and 13B are sectional views as seen from the plane indicated by the line 13a-13a in FIGS. 10A and 13b-13b in FIG. 10B, respectively;

BEST MODE FOR CARRYING OUT THE INVENTION

The present invention is adaptable to a wide variety of applications. It may be used in connection with a water softening apparatus such as that shown in U.S. Pat. No. 3,891,552, as well as other types of treatment apparatus, such as deionization systems an example of which is illustrated in U.S. Pat. No. 4,427,549. To facilitate the description of the invention, however, the invention will be described in connection with a water softening system. It should be understood, however, that this description is not meant to limit the scope the present invention or to preclude its applicability to other types of water treatment apparatus.

Figure 1:
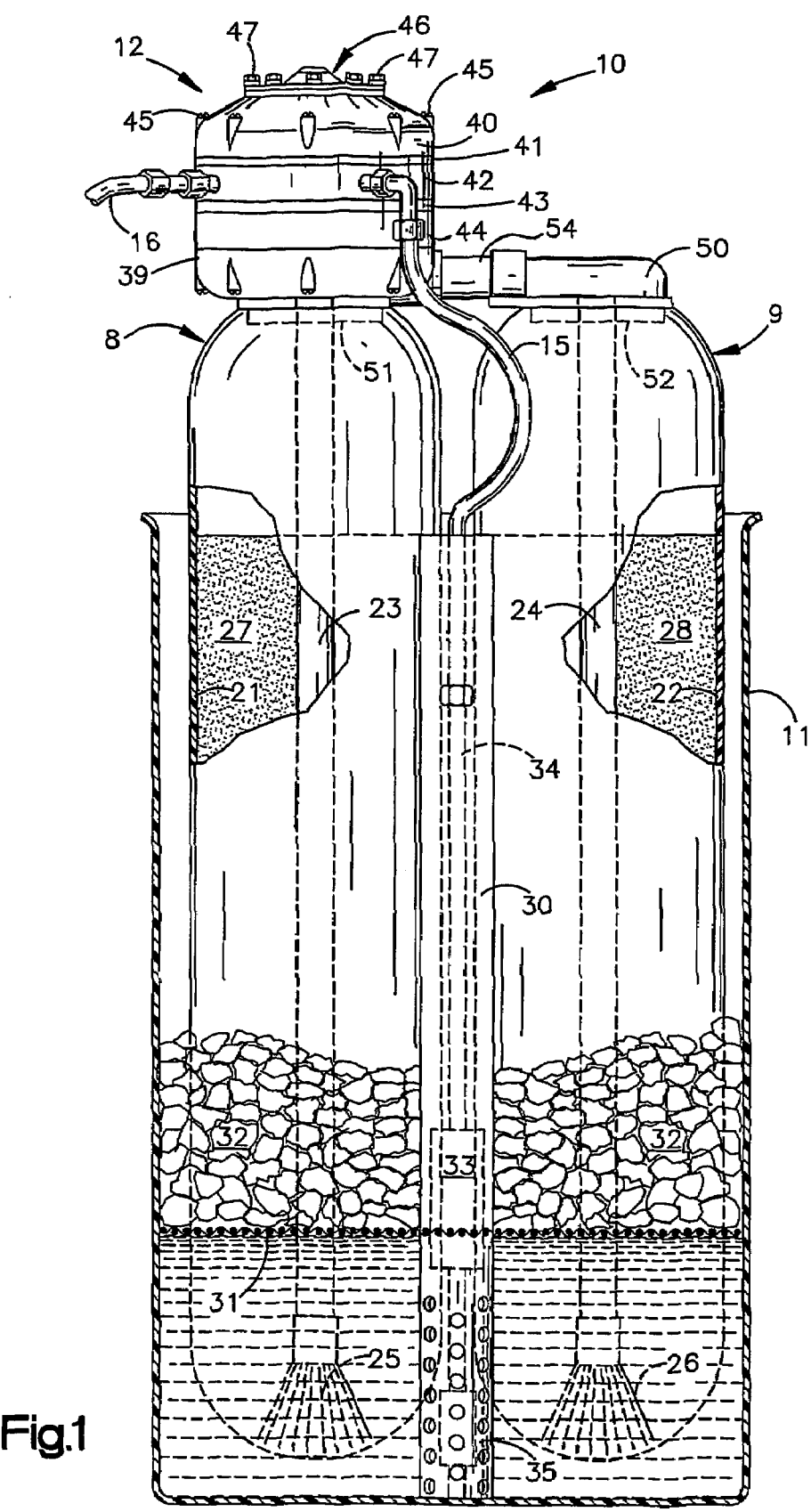
FIG. 1 is a side elevational view, partly in section, of a water softener employing a control valve of the present invention.

Referring to FIG. 1, a water softener 10 includes a pair of softener tanks 8, 9 positioned upright in an open-top brine tank 11. A valve assembly 12 is supported atop the tanks 8, 9. The valve assembly 12 is operative, as will be explained, to selectively maintain one of the tanks 8, 9 on-line with a household water supply system. The off-line tank is subjected to a regeneration cycle and then held off-line until the on-line tank is exhausted. The valve assembly 12 controls the regeneration process.

Figure 2:
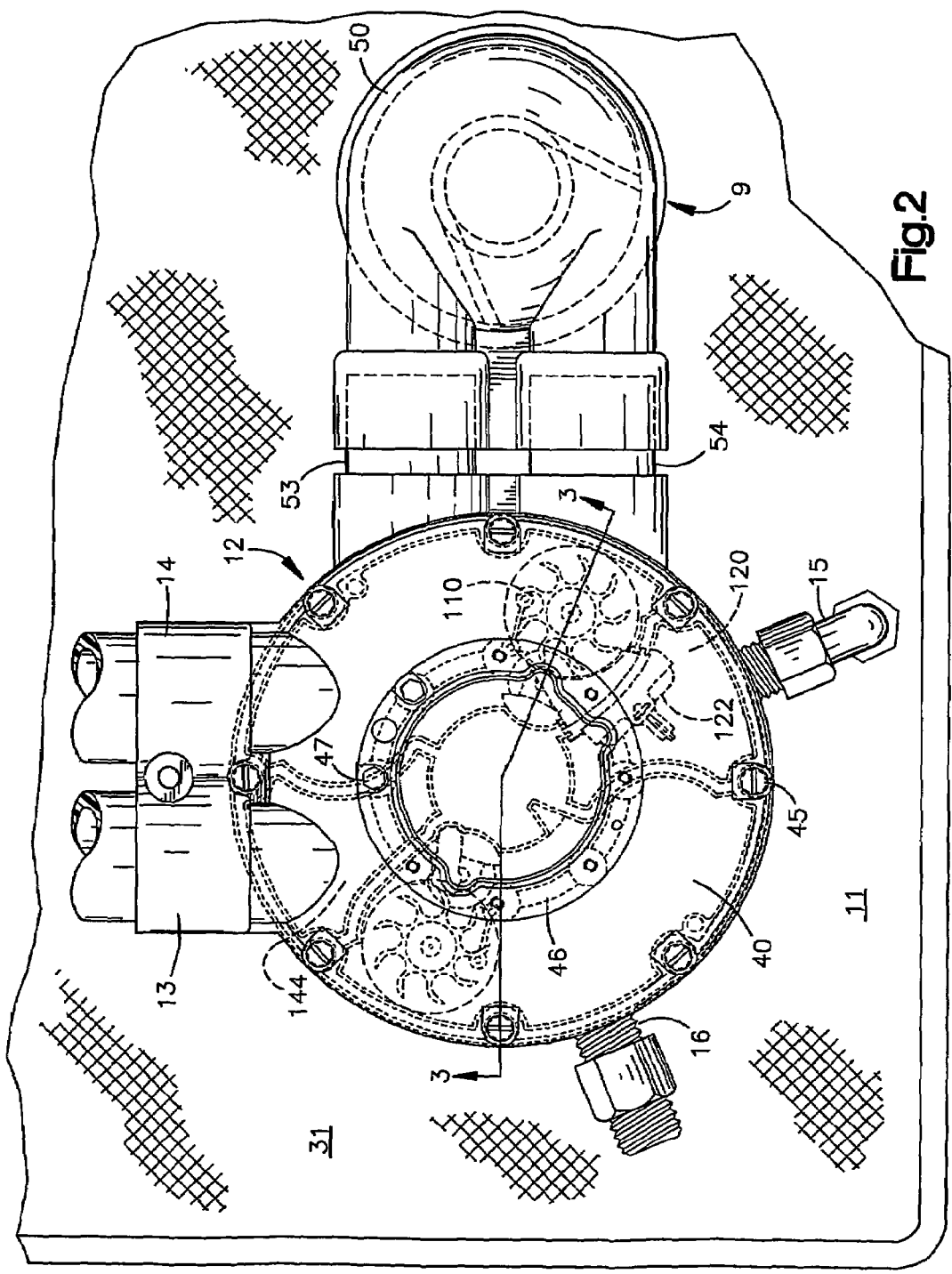
FIG. 2 is a plan view of the control valve shown in FIG. 1.

Referring also to FIG. 2, four conduits communicate with the valve assembly 12. Hard water is delivered to the valve assembly 12 through an inlet conduit 13. Softened water is discharged from the valve assembly 12 through an outlet conduit 14. Brine from the brine tank 11 is admitted to the valve assembly 12 through a brine conduit 15. Waste water from the regeneration cycle is discharged from the valve assembly through a drain conduit 16.

The softener tanks 8, 9 are of known configuration and utilize common water softening chemicals. The tanks 8, 9 typically include cylinders 21, 22 of glass fiber construction which may be about 7 inches in diameter and 35 inches in length. The upper ends of the cylinders 21, 22 are threaded with female 2½ inch NPT threads for connection to the valve assembly 12. Riser pipes 23, 24 depend centrally through the cylinders 21, 22. A pair of screens 25, 26 communicate with the lower ends of the riser pipes, 23, 24. Suitable ion-exchange softening chemicals, indicated by the numerals 27, 28, are positioned in the cylinders 21, 22 surrounding the riser pipes 23, 24 and the screens 25, 26.

The water softening process takes place as water passes through the tanks 8, 9. Hard water is channeled into the cylinders 21, 22 and is softened during its passage downward through the chemicals 27, 28. Softened water enters the riser pipes 23, 24 through the screens 25, 26 and is directed back out of the cylinders 21, 22.

The brine supply system is of known configuration and may utilize common ion replacement salts to regenerate the softening chemicals 27, 28.

A screen 31 extends horizontally in the brine tank 11 in regions around the softener tanks 1, 2 and around the brine well 30. The screen 31 is positioned about six inches up the wall of the brine tank 11. Granular salt material 32 is deposited in the brine tank 11 and rests atop the screen 31.

A brine control valve 33 of known configuration is positioned in the brine well 30. The valve 33 includes a pipe 34 which is connected at its upper end to the brine conduit 15. The lower end of the pipe 34 communicates with a valve assembly 35 which serves the dual functions of admitting a regulated amount of brine solution from the brine well 30 to the pipe 34 when the water softener establishes a suction in the brine conduit 15, and of admitting a regulated amount of softened water to the brine well 30 from the pipe 34 when the brine conduit 15 is connected to a source of pressurized softened water.

The valve assembly 12 includes a stacked array of four disc-like members 41, 42, 43, 44 interposed between a base member 39 and a top member 40. Threaded fasteners 45 extend through aligned holes in the top and disc members 40-44 and are received in threaded holes formed in the base member 39 to clamp the members 39-44 together. A cover assembly 46 overlies portions of the top member 40 and is held in place by threaded fasteners 47.

A tank connector 50 is provided to the right of the base member 39 as viewed in FIGS. 1 and 2. Threaded depending necks 51, 52 are formed on the base member 39 and on the tank connector 50 for connection with the softener tanks 8, 9. A pair of conduits 53, 54 establish communication between the base member 39 and the tank connector 50. Hard water is delivered from the base member 39 through the conduit 53 and through the tank connector 50 to the softener tank 9. Softened water from tank 9 is returned through the tank connector 50 and through the conduit 54 to the base member 39.

Except for the disc member 40 and its associated components, the construction and operation of the remaining portions of the valve assembly 12 are substantially identical to that disclosed in U.S. Pat. No. 3,891,552, which is hereby incorporated by reference. By way of summary, the stacked members 41, 42, 43, 44 and base member 39, together house a plurality of servo valves which control the communication of the tanks 8, 9 with the brine solution in the tank 11 and with the inlet and outlet conduits 13, 14. Movement in the servo valves is achieved by the selective application of pilot pressures to piston chambers associated with each servo valve. The communication of these pilot pressures to the piston chambers is determined by a servo control mechanism housed in the member 40 that is constructed in accordance with the present invention.

Figure 3:
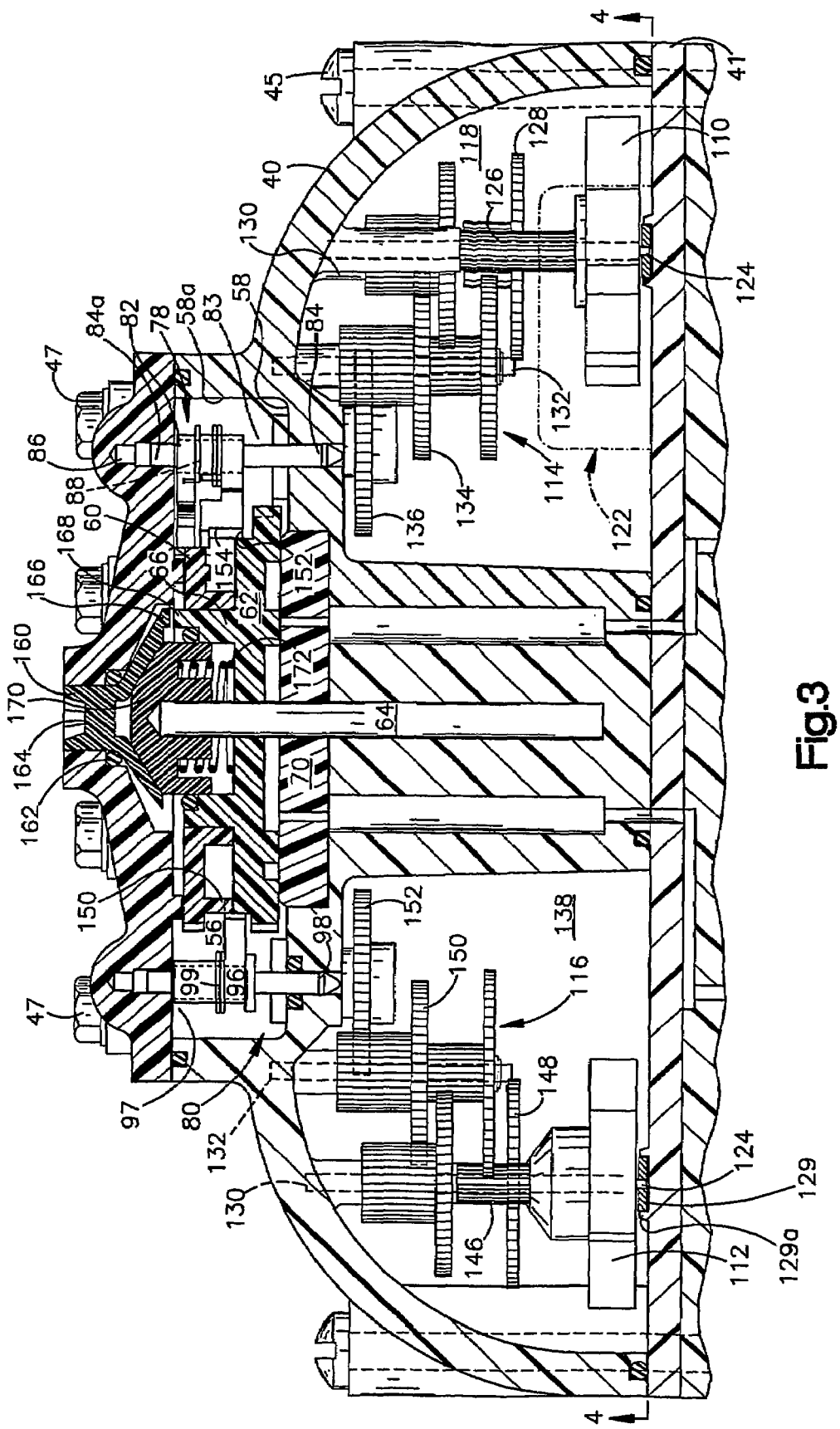
FIG. 3 is a cross-sectional view of the control valve as seen from the plane indicated by the line 3-3 in FIG. 2.
Figure 4:
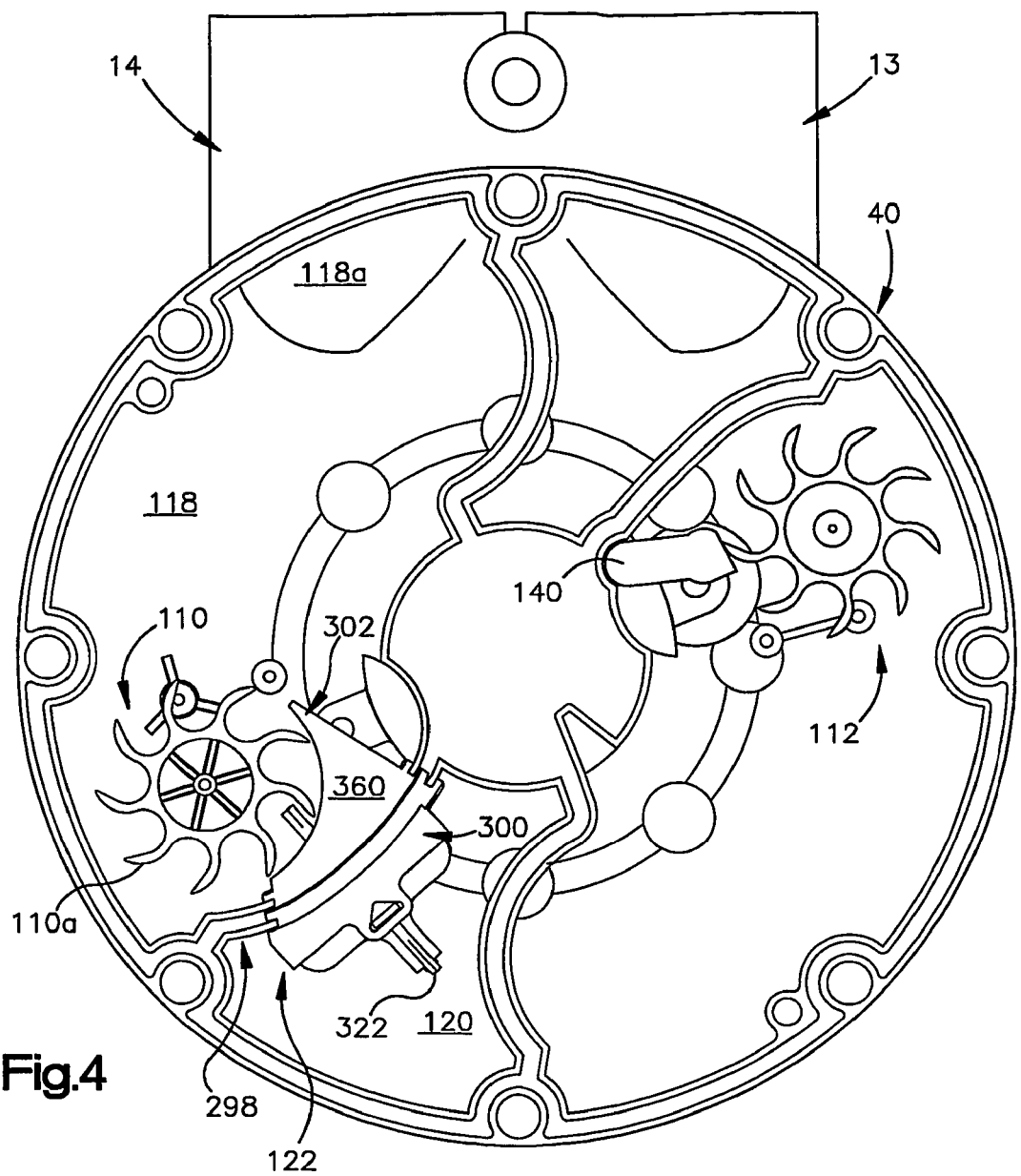
FIG. 4 is a cross-sectional view of the control valve as seen from the plane indicated by the line 4-4 in FIG. 3.
Figure 5:
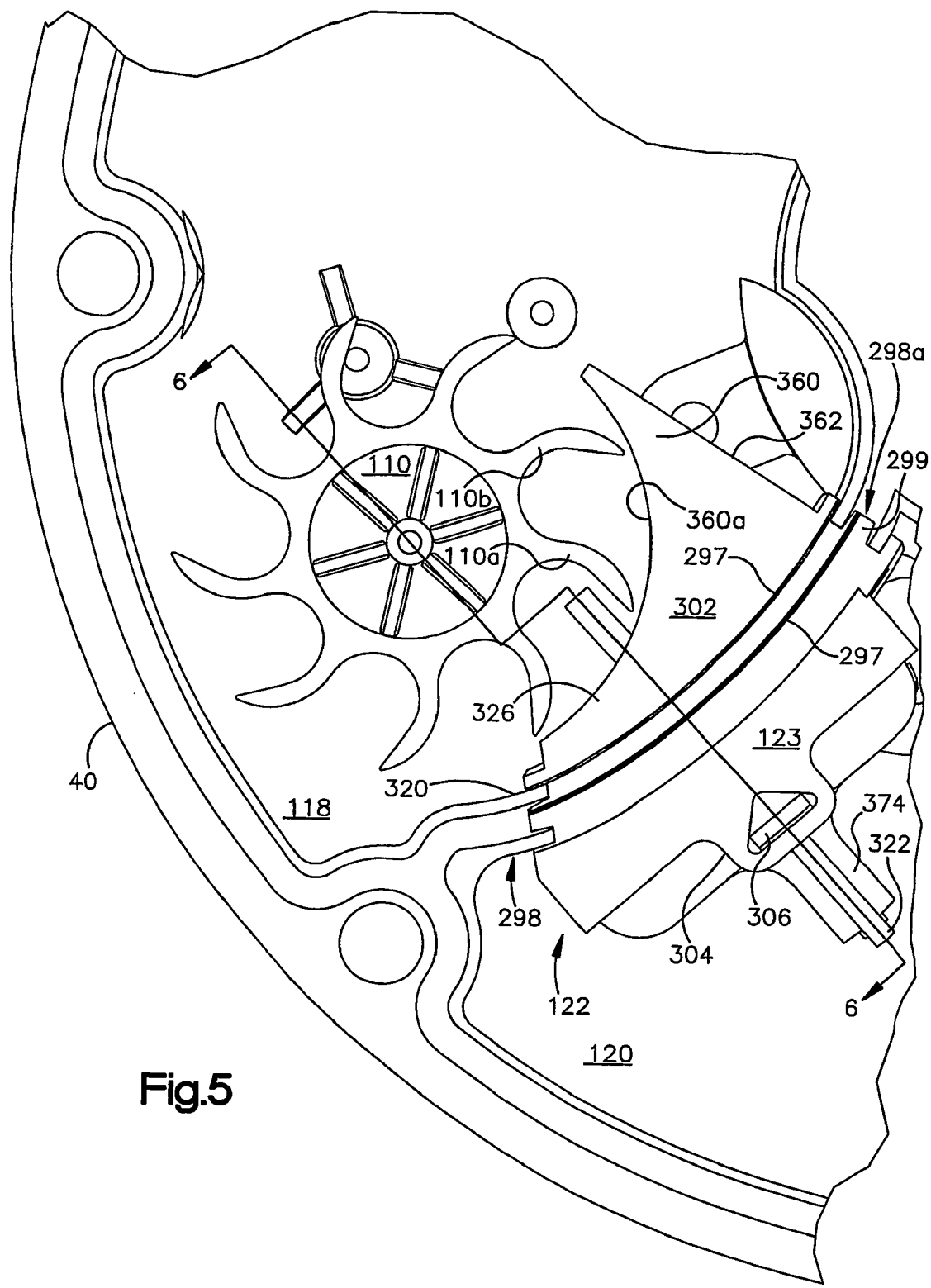
FIG. 5 is an enlarged fragmentary view of the control valve shown in FIG. 4.

Referring also to FIGS. 3-5, the servo control mechanism is located in an enclosed chamber 56 defined by a recess 58 in the top member 40 and the cover assembly 46 which overlies the recess. The servo control mechanism includes a pair of concentrically positioned discs 60, 62, each disc having perimetrically disposed ratchet teeth 60a, 62a, respectively. An upwardly extending stub shaft 64 defines an axis of rotation for the discs. The lower disc 62 is journaled on the shaft 64 and includes a hub 66 (shown in FIGS. 3 and 5) which rotatably supports the upper disc 60.

The upper disc 60 was usually designated as a water usage monitor disc in the control valves disclosed in the above identified patents and its movement was a function of the amount of softened water discharged by the water control valve assembly 12 through the outlet 14. In the present invention, the water usage disc 60 controls the regeneration frequency based on the quantity of fluid treated. The lower disc 62 is a regeneration control disc and its movement controls the regeneration sequence for an exhausted softener tank after a regeneration cycle is initiated by the water usage disc.

As explained in greater detail in U.S. Pat. No. 3,891,552, the regeneration control disc 62 rotates in confronting contact with a disc-like, non-rotatable insert 70, positioned in the bottom of the recess 58. The insert includes a plurality of ports which communicate with piston chambers that operate the servo valves through pilot pressure passages integrally formed in the various members of the control valve assembly 12.

In the preferred embodiment, the water usage and regeneration control discs 60, 62 are incrementally rotated by an indexing arrangement in the form of ratchet drives 78, 80. The ratchet drive 78 comprises a pair of pawls 82, 83 journaled and co-driven by an eccentric shaft 84. The upper end 84a of the shaft 84 is located by a bore 86 in the top cover assembly 46 (see FIG. 3). A spring 88 acting between a side wall 58a of the recess 58 urges the pawls 82, 83 towards the peripheral ratchet teeth 60a, 62a of the water usage and regeneration control discs 60, 62, respectively. A fixed, resiliently biased pawl 94 also engages the ratchet teeth of the upper disc 60 and prevents reverse rotation.

The ratchet drive 80 comprises a pawl 96 journaled an driven by an eccentric shaft 98 and urged toward engagement with the regeneration control disc 62 by a spring 99 acting between the side wall 58a and the pawl 96. A spacer bushing 97 maintains the pawl 96 in the lower most position on the shaft 98 as shown.

Referring to FIGS. 2, 3 and 5 the eccentric shafts 84, 98 which upon rotation produce the necessary reciprocating motion in the ratchet drives 78, 80 are coupled to regeneration initiating and regeneration control turbines 110, 112 by reduction gear trains, indicated generally by the reference characters 114, 116, respectively. The water usage turbine 110 (if used) and associated gear train are located in an outlet chamber 118 defined by the top member 40 and the upper disc member 41 that communicates with the outlet conduit 14 via passage 118a (shown in FIG. 4).

Figure 6:
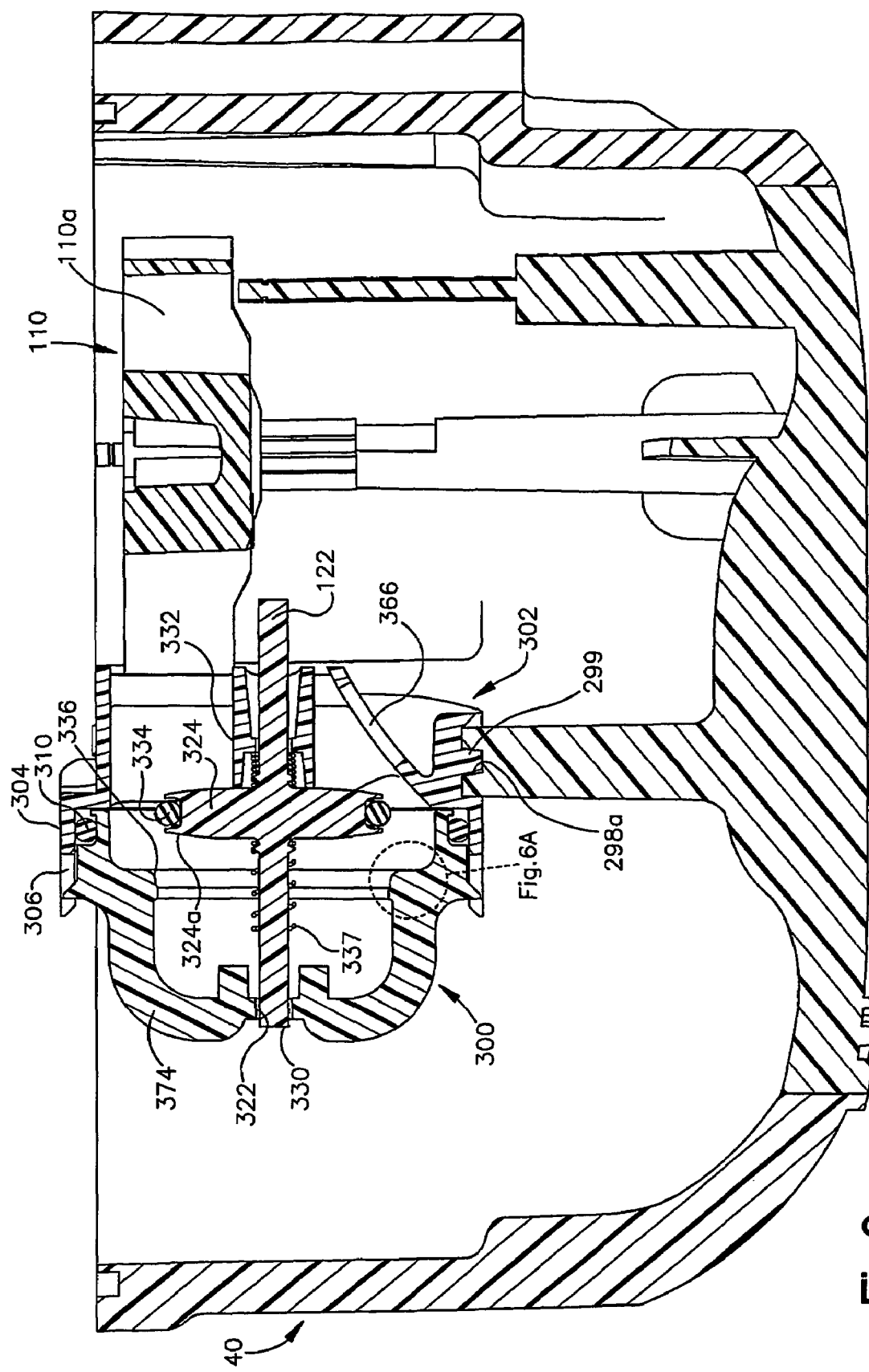
FIG. 6 cross-sectional view as seen from the plane indicated by the line 6-6 in FIG. 5 with components removed.

According to the invention, softened water is delivered to the outlet chamber 118 from a softened water collection chamber 120 by way of a nozzle assembly 122 (shown best in FIGS. 5-7). The flow of softened water to the collection chamber 120 from the softener tanks 8, 9 is controlled by servo valves housed in the lower portions of the control valve assembly 12 and described fully in the above referenced patents. The nozzle assembly 122 directs softened water from the collection chamber 120 to the turbine blades 110a and thus any softened water discharged through the control valve causes attendant rotation in the water usage turbine 110.

The water usage turbine 110 is rotatably supported by a downwardly extending shaft 124 and includes an integrally formed pinion gear 126 that drives a first reduction gear 128. The shaft 124 for supporting the turbine 110 is stabilized by bearing 129 which is held within a recess defined by a circular projecting wall 129a formed in a top surface 41a of the control valve member 41. A plurality of cascading reduction gears are journaled on spaced shafts 130, 132. A final reduction gear 134 mates with an input gear 136 fixed to the end of the eccentric shaft 84.

The regeneration control turbine 112 and associated gear train is located in an overflow chamber 138 defined by the top member 40 and the upper disc member 41. During a regeneration cycle, a controlled flow of softened water is discharged through a regeneration control nozzle 140 located in close proximity to the regeneration turbine 112 so that the discharged fluid impinges on the turbine blades to cause rotation in the turbine 112. The fluid leaving the turbine blades leaves the overflow chamber through a port 142 that communicates with the drain conduit 16.

The incoming hard water is delivered to an inlet chamber 144 through the inlet conduit 13. The inlet chamber 144 is defined in part by the top member 40. The communication of the incoming hard water to one or both of the tanks 8, 9 is controlled by inlet valves described and discussed in the above referenced patents.

The regeneration control turbine 112 includes an integrally formed pinion gear 146 that drives a first reduction gear 148. A similar cascading gear train is in turn driven by the first reduction gear 148. A final reduction gear 150 mates with an input gear 152 fixed to the end of the eccentric shaft 98 that journals the pawl 96. Thus, rotation of the regeneration turbine during a regeneration cycle is translated to reciprocating motion in the pawl 96 which in turn causes incremental movement in the regeneration control disc 62.

A more complete description of the regeneration process including the treatment steps that are controlled by the regeneration control disk 62 is more fully described in U.S. Pat. Nos. 3,891,552 and 4,298,025, both of which are hereby incorporated by reference. It should also be noted, that a description of the regeneration cycle, controlled by a control disk when forming part of a deionization process is more fully disclosed in U.S. Pat. No. 4,427,549, which is also incorporated by reference.

Turning specifically to FIGS. 4-13B, the construction and orientation of the nozzle 122 is most clearly illustrated. The nozzle assembly 122 extends through a dividing wall 298 which is integrally formed in the cover 40 of the control valve 12. The dividing wall 298 at least partially defines the softened water collection chamber 120 and the water usage turbine chamber 118.

Referring to FIG. 5, the dividing wall 298 includes a notch 298a which is configured to receive the nozzle assembly 122. Three sides of the nozzle 122 include a tongue 299, which is sized and configured to sealingly engage the notch 298a (see FIGS. 6 and 14). The top of the nozzle (as viewed in FIG. 5, which is actually the bottom of the nozzle 122 when the valve is oriented in its operating position) includes a pair of crush ribs 297. The crush ribs 297 provide a sealing interface between the top of the nozzle 122 (again, as viewed in FIG. 5) and a seal that is used to seal adjacent housing portions 40, 41 (see FIG. 3). The crush ribs 297 may deform to effect the sealing engagement between the nozzle 122 and the seal/housing member 41 In the preferred embodiment (shown in FIG. 5), a pair of crush ribs is utilized. The invention also contemplates using a single crush rib. A single crush rib is shown in some of the other Figures such as FIGS. 4 and 8B.

The nozzle assembly 122, unlike the prior art constructions, can accommodate a wide range of water flow rates. This is achieved by providing dual fluid flow paths to the turbine 110, one of which includes pressure responsive valve element that remains in a closed position until a threshold flow rate is exceeded. The other flow path comprises a fixed fluid passage that includes a fixed orifice having a predetermined diameter. When treated water is being delivered at a relatively low flow rate, all the treated water flows through the orifice and is directed at the turbine blades 110a. The orifice creates a high velocity stream which impinges on the blades. This high velocity stream produces forces on the turbine blades which result in rotation of the turbine, even at low flow rates.

As the demand for softened water increases, the flow rate through the valve increases. The water flowing from the outlet chamber 120 into the collection chamber 118 (via the nozzle assembly 122) produces a pressure drop. This pressure drop is felt by the valve element forming part of the second flow path. When a sufficient force is applied to the valve (that exceeds a preset value), the valve opens to allow treated water to flow along the second flow path which includes control structures that channel the water towards the turbine blades. The water flowing along the second flow path also produces forces on the turbine blades to effect rotation. The number of revolutions or rate of rotation of the turbine being is function of the flow rate of fluid flowing along the second flow path. With the disclosed nozzle assembly, a wide range of flow rates can be monitored. In particular, it has been found that with the disclosed construction, flow rates from 0.05 gallons per minute to 30 gallons per minute can be monitored.

Referring, in particular, to FIGS. 5-7, the nozzle assembly 122 includes a housing 123 (see FIG. 5) that is defined by a shroud 300 and a throat 302. In the preferred and illustrated embodiment, the shroud 300 and throat 302 snap together to form the unitary housing 123. Apertured tabs 304 on the throat 302 are engageable with associated lugs 306 formed on the shroud 300. In the preferred and illustrated embodiment, the shroud and throat 300, 302 are injection molded components. A seal 310 is used to seal the interface between the shroud 300 and the throat 302.

The above-mentioned pressure responsive valve element comprises a poppet piston 320. The poppet piston 320 is reciprocally movable within the housing 123 defined by the shroud and throat 300, 302. In particular, the poppet piston 320 includes a shaft 322 that extends fore and aft of a piston head 324. The piston shaft 322 is slidably carried by bearings 330, 332 formed in the shroud and throat 300, 302, respectively. The piston head carries an O-ring 334 that is sealingly engageable with a piston seat defined by a circular opening 336 defined by the shroud. (The diameter of the opening 336 is slightly less than the diameter of the piston head 324 with the O-ring 334 installed and in a relaxed state.)

It should be noted here that in the preferred and illustrated embodiment, a separate O-ring 334 is used to seal the piston head 324 with the piston seat 336. It should be understood that alternate constructions are contemplated that could eliminate the need for a separate O-ring. In particular, well known overmolding techniques could be used to mold a sealing material on the piston head 324. Alternatively, material selections for the piston head 324 and/or the seat 336 could be selected such that a seal is formed when the two components engage.

In the preferred and illustrated embodiment, the bearings 330, 332 provide a loose, sliding fit between themselves and the piston shaft 322. The added clearance between the shaft and the bearings allows some lateral movement between the poppet piston and the bearing so that the piston head 324 can shift slightly in order to align itself with the seat 336 as engagement occurs. In the preferred and illustrated embodiment, the shape of the seat 336 is configured to facilitate seating of the piston head 324 in the seat 336. Referring in particular to FIG. 6A, the seat 336 includes a large radiused entry surface 336a. The radiused entry surface 336a merges smoothly with a reverse radius seating surface 336b which defines the seating surface for the O-ring 334. The seating surface 336b merges into a uniform diameter portion 336c which defines the minimum diameter of the seat 336. It should be noted, however, that the outboard end of the uniform diameter surface 336c may have a slight radius to facilitate movement of the piston head 324 through the opening defined by the surface 336c under certain operating conditions to be explained.

The poppet piston shaft 322 carries a tail spring 337 and a main spring 338, the tail spring 337 being located on the upstream side of the poppet piston and the main spring being positioned on the downstream side of the poppet piston. The tail and main springs 337, 338 are selected such that the main spring exerts a biasing force on the poppet piston tending to drive it into sealing contact with the piston seat 336 defined by the shroud 300. In short, the spring constant and size of the main spring 338 is selected such that it exerts a greater force on the piston than the tail spring at least until the poppet piston head 324 is in contact with the poppet seat 336.

The throat 302 defines a channel for delivering water flowing along the second flow path to the turbine 110. The throat 302 also defines the passage and orifice that forms the first flow path. As seen best in FIGS. 6, 7, 8A and 8B, the outlet for the nozzle is defined by an upper wall 360 having an arcuate edge 360a intended to conform to the periphery of the turbine 110. A side wall 362 extends downwardly from the top wall and, as seen in FIG. 7 merges with a lower wall 366 (also shown in FIG. 6). As seen in FIG. 7, the first fluid flow path is defined by a boss 364 integrally molded with the side wall 362 which defines a fluid passage 365 that terminates in an orifice 368 (see FIGS. 13A, 13B). The downstream or inlet of the first flow path is defined by a rectangular opening 370 (shown in FIGS. 8A, 8B) formed in the throat 302.

Referring to FIGS. 7 and 8A, a pair of vertical vanes 371, 372 extend from the upper wall 360 to the lower wall 366 and are angled at predetermined angles and serve to direct the flow of water towards the blades 110a of the turbine 110. To further control the direction of water flow through the nozzle and hence the impingement angle with the turbine, the housing defines an angled side wall 380 which imparts a direction to the water. It should be noted that the angle of the wall 380 is similiar (but not identical) to the angles at which the vanes 371, 372 are positioned. The bearing 332 for supporting the downstream side of the piston shaft 322 is integrally molded between the vanes 371, 372.

As seen best in FIG. 7, the vanes 371, 372 define channels 373a, 373b, 373c through which the water flows. The present invention contemplates modifications to the nozzle 122 which could include fully or partially blocking these channels to reduce the cross-section of the throat. For some applications it may be desirable to reduce the effective size of the throat.

The bearing 330 which reciprocally supports the upstream side of the piston shaft is defined by a vertical yoke 374 which is integrally formed in the shroud 300.

In normal operation, when water is being delivered by the control valve, water initially flows along the first fluid flow path defined by the passage and orifice. As the demand increases, the pressure drop developed across the outlet chamber 120 and the collection chamber 118 applies forces to the upstream side 324a (see FIG. 6) of the piston head 324. When the fluid force developed on the upstream side of the piston face is sufficient to overcome the spring force exerted by the main spring 338, the piston head 324 moves away from the seat 336 defined by the shroud 300 and water is allowed to flow past the poppet piston, through the channel, finally impinging against the turbine blades 10a resulting in turbine rotation (FIG. 6 illustrates an open position of the poppet 320. Since the poppet piston is spring biased towards its closed position, it will reclose when the flow rate decreases below a threshold limit. On the other hand, the extent of movement in the poppet piston 324 away from the seat 336 is a function of the flow rate. The higher the flow rate, the further the poppet piston 320 moves away from its seat 336.

In the preferred and illustrated embodiment, the nozzle assembly includes a fail safe feature should the control valve experience "reverse" flows. For example, if the control valve is improperly connected, pressurized water will generally flow in a reverse direction, i.e., from the collection chamber 118 to the outlet chamber 120. Temporary back pressure surges or "hammering" in a properly connected system can also produce temporary reverse flows (of a very short duration) in the control valve. If the first fluid flow path (defined by the passage 335 and orifice 368) is incapable of supporting the flow rate of the incoming (reverse flowing) water, a pressure drop will develop across the piston head 324 resulting in a fluid pressure generated "closing force" being applied to the downstream side 324b of the piston.

Figure 14:
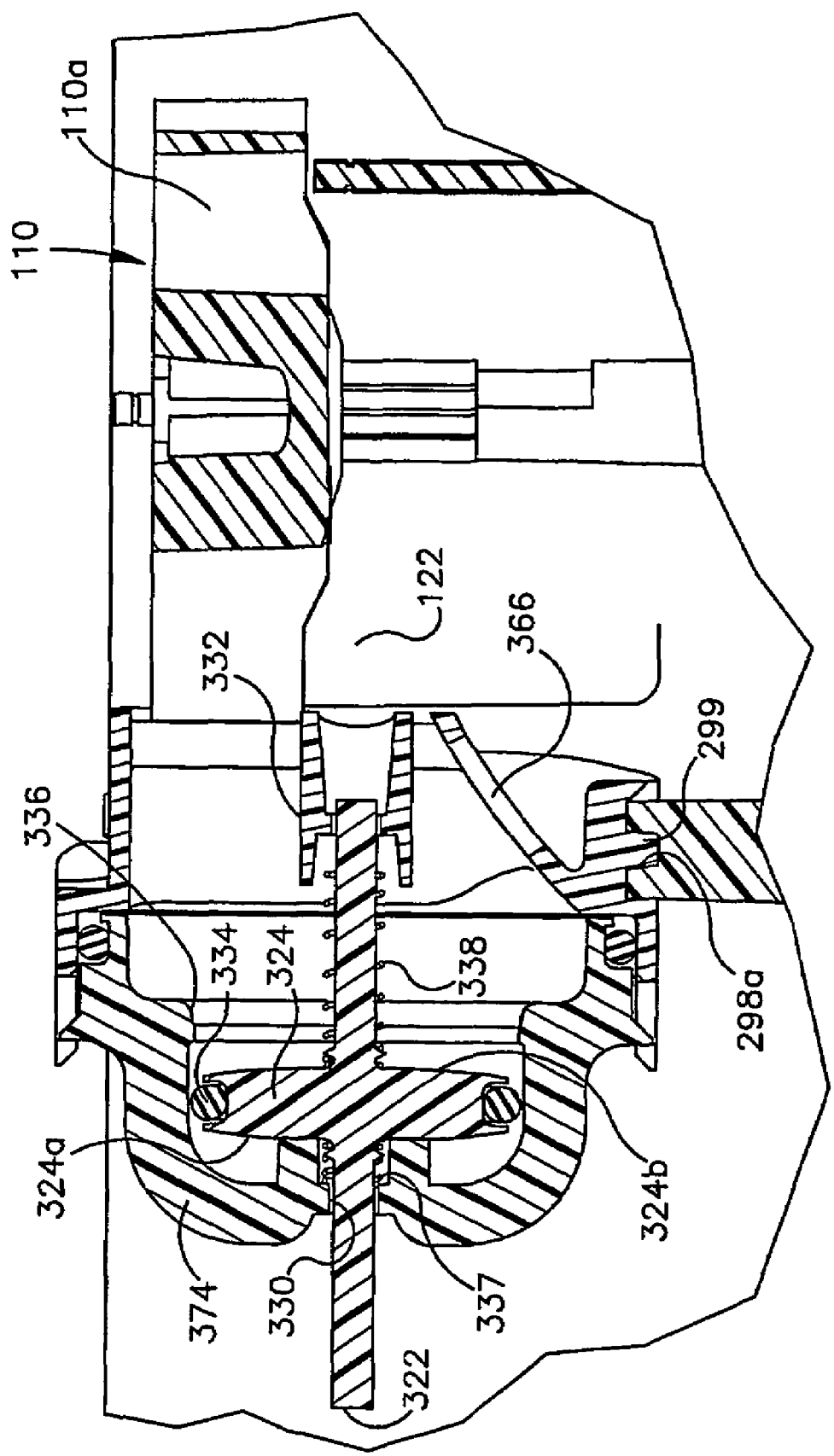
FIG. 14 is enlarged, fragmentary view of FIG. 6, showing a poppet piston in an "over center" position.
Figure 15:
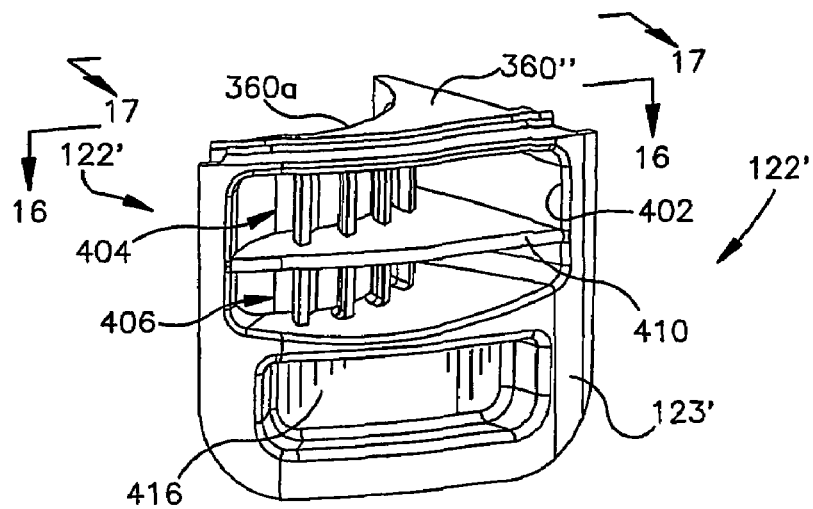
FIG. 15 is an isometric view of an alternate nozzle configuration constructed in accordance with another preferred embodiment of the invention.

According to a feature of the invention, the poppet seat 336, defined by the circular opening formed in the shroud and the O-ring seal carried by the poppet, are sized and selected such that if sufficient force is applied to the downstream side 324b of the piston head 324, it can move past its normal closing position and move through the circular opening 336 thus providing an opening through which water can flow from the collection chamber 118 into the outlet chamber 120. An "over center" position is illustrated in FIG. 14. The O-ring 334 compresses to allow the piston head to pass through the opening 336. Once the poppet piston moves through the circular seat 336, the tail spring 337 develops a force on the piston head 324 tending to move it towards its seat 336. When the plumbing connection is corrected (or temporary surge is alleviated), and water begins to flow from the outlet chamber 120 into the collection chamber 118, the pressure drop across the poppet piston 324 will develop a force urging it towards the right as viewed in FIGS. 6 and 14. Once a sufficient force is applied to the poppet piston, the O-ring will be again be forced to compress thereby allowing the piston head 324 to move through the poppet seat 336 to its normal operating position. In the preferred embodiment, the force needed to move the poppet piston through the seat 336 is greater than the force needed to move it from its normally closed position to an open position.

The ability of the poppet piston 320 to move "over center" allows the nozzle assembly to accommodate temporary instances of reverse flow which could otherwise damage the nozzle 122. In effect, the construction and configuration of the poppet piston 320 in conjunction with the seat 336 allows it to serve as a relief valve to relieve pressures on the piston head 324 generated by the flow of water from the collection chamber 118 to the inlet chamber 120.

FIGS. 9A-13A illustrate various cross-sections of the nozzle assembly 122 with the poppet piston 320 in its closed position. FIGS. 9B-13B illustrate the same cross-sections of the nozzle assembly 122 with the poppet piston 320 shown in its fully opened position. The position of the cross-sections are indicated in FIGS. 9A, 10A.

According to a feature of the present invention, the nozzle assembly 122 may be replaced by alternate nozzle configurations in order to accommodate particular water flow applications or conditions. FIGS. 15-22 show details of the constructions of two alternate nozzle configurations. In the preferred construction, the alternate nozzles are mounted in the notch 298*a* (see FIG. 5) that is formed in the dividing wall 298 of the valve housing.

FIGS. 15-18 illustrate the configuration of a nozzle 122' intended for intermediate flow applications. The features and structures of the alternate nozzles that are similar to those features and structures of the nozzle 122 will be labeled with the same reference character followed by an apostrophe. Like the nozzle 122, the nozzle 122' includes a housing 123' which defines a throat 302' (see FIG. 17. In the preferred embodiment, the nozzle 122' is mounted and held in the dividing wall 298 in the same way as the nozzle 122. In particular, the nozzle 122' includes the same engagement structure that forms part of the nozzle 122 (i.e. the crush ribs 297 and the tongue 299 shown in FIG. 5) and need not be repeated here.

Figures 16, 17:
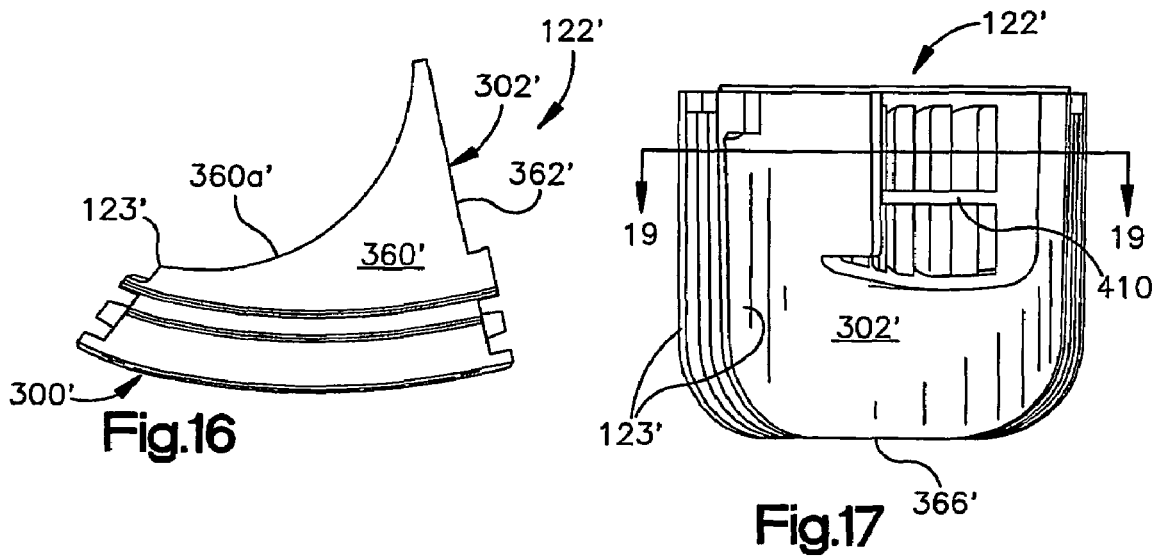
FIG. 16 is a top plan view of the nozzle shown in FIG. 15.
FIG. 17 is a side elevational view of the nozzle shown in FIG. 15.

The throat 302' defines a channel for delivering water to the turbine 110. The outlet for the nozzle 122' is defined by an upper wall 360' having an arcuate edge 360*a'* that is intended to conform to the periphery of the turbine 110. A side wall 362' extends downwardly from the top wall and as seen in FIG. 16, merges with a lower wall 366'.

An inlet or entrance 402 to the nozzle is defined by the housing 123'. In this embodiment, the inlet opening 402 is oblong i.e. it has a transverse dimension that is greater than its vertical dimension as viewed in FIG. 15. As seen best in FIGS. 15 and 16, two sets of vanes or louvers form part of the throat and are indicated generally by the reference characters 404, 406. The sets of vanes are separated by a horizontal plate 410 which serves as a support for the vanes to reduce tendency of warping or deformation and to also help direct the flow of water to the turbine. For some applications the horizontal support plate 410 could be eliminated and only one set of vanes would be used.

Figure 18:
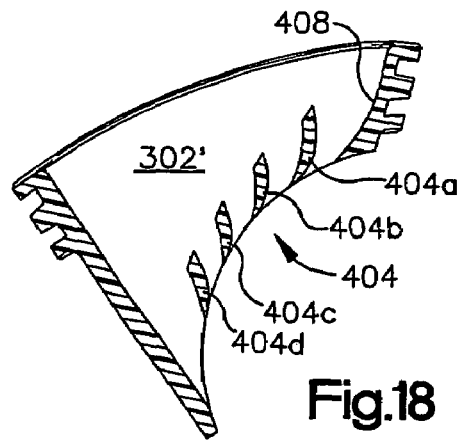
FIG. 18 is a sectional view as seen from the plane indicated by the line 18-18 in FIG. 17.
Figure 19:
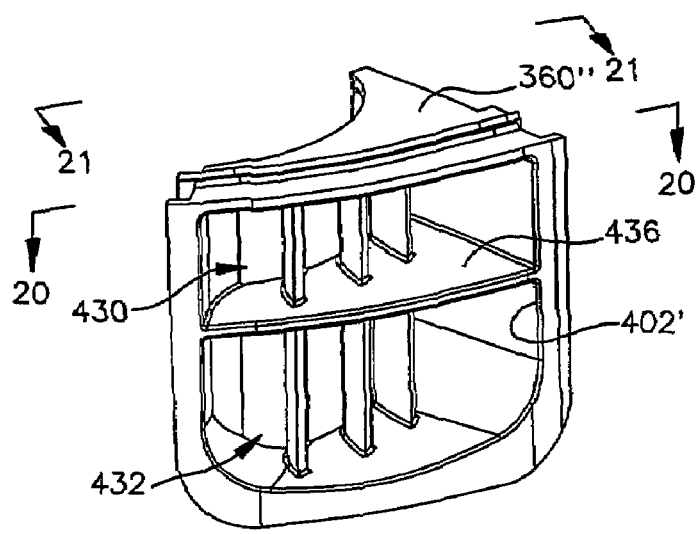
FIG. 19 is an isometric view of another nozzle configuration constructed in accordance with the preferred embodiment of the invention.

As seen best in FIG. 18, the set of vanes 404 comprises four individually molded vanes 404*a*, 404*b*, 404*c*, 404*d*. The vanes 404*a-d* are spaced apart and in the preferred embodiment are arranged at an angle with respect to the turbine with each vane oriented at a slightly different angle. In the preferred embodiment, the vanes are slightly arcuate. The vanes that comprise the vane set 406 are similarly configured. It has been found that with the vanes configured as illustrated, the water flowing through the nozzle is directed towards the periphery of the turbine 110 (shown in FIG. 5). The vanes impart a direction to the water flow so that the water tends to impinge the turbine blades in a normal direction with respect to the surface of the blades. To further control the direction of water flow through the nozzle and hence the impingement angle with the turbine, the housing defines an arcuate side wall 408. The shape of the arc in the sidewall 408 is similar to the arc forming part of the vanes 404, 406. It has been found that with the illustrated vane construction, turbine sensitivity to low flow rates is improved and the nozzle does not create an unacceptably high pressure drop across itself at high water flow rates.

As indicated above, the illustrated nozzle 122' is intended for intermediate flow applications. This is achieved not only by the configuration of the vanes 404, 406, but by blocking off a part of the housing 123' in order to define a smaller entrance or inlet 402. In particular, a wall 416 (shown best in FIG. 15) is molded into the housing 123' of the nozzle 122' so that all water passing through the nozzle must pass through the oblong inlet opening 402.

FIGS. 19-22 illustrate an alternate nozzle 122'' which is intended for higher water flow rates, as compared to the configuration of the nozzle 122' shown in FIGS. 15-18. In order to facilitate the description of the nozzle 122'', features and structures that are similar to those shown in connection with the nozzle 122 will be given the same reference character followed by a double apostrophe.

Figure 20:
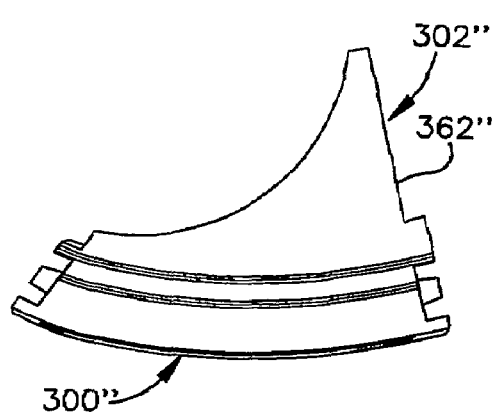
FIG. 20 is a top plan view of the nozzle shown in FIG. 19.
Figure 21:
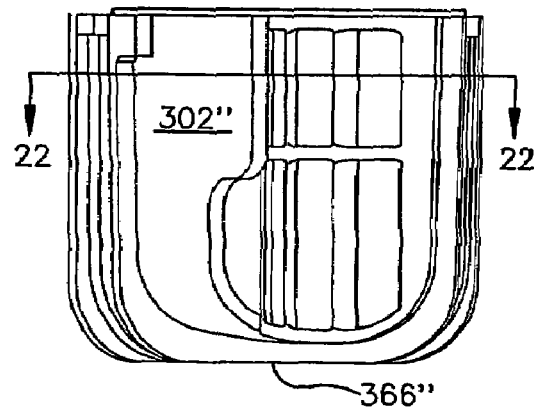
FIG. 21 is a side elevational view of the nozzle shown in FIG. 19.
Figure 22:
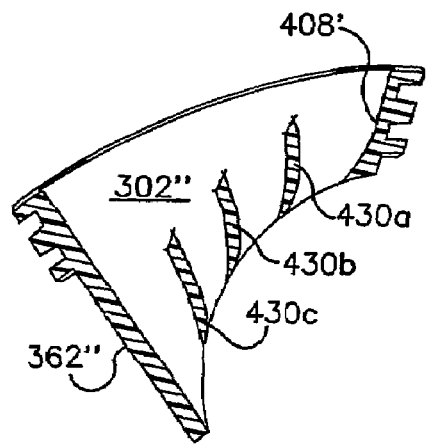
FIG. 22 is a section view of the nozzle as seen from the plane indicated by the line 22-22 in FIG. 21.

As seen best in FIG. 20, the nozzle includes a housing 123'' that defines a throat 302''. Unlike the nozzle 122', the nozzle 122'' does not include a blocking wall 416. Instead, the housing 123'' defines an enlarged entrance or inlet 4021 that is almost square in shape. In this configuration, two sets of flow vanes or louvers are provided, indicated generally by the reference characters 430, 432. A horizontal or transverse wall 436 divides or separates the two sets of louvers and also provides support for the vanes to reduce deformation and bending and also helps direct the flow of water to the turbine. As seen best in FIG. 22, each set of vanes comprises three vanes that are spaced apart and set at a predetermined angle with each vane located at an angle different from the others of a set. The vane set 430 includes vanes 430*a*, 430*b* and 430*c*. Each vane is preferably arcuate in shape. In the preferred embodiment, the vanes have a reverse arc. The vanes that comprise the vane set 432 are similarly configured. Like the vanes 404, 406 of the nozzle 122', the vanes 430, 432 impart a direction to the water flow so that the water tends to impinge the turbine blades in a normal direction with respect to the surface of the blades. An inner sidewall 408' of the housing 123'' is arc shaped in order to also impart direction to the flow of water.

The nozzle 122'' creates a smaller pressure drop at high flow rates as compared to the configuration of the nozzle 122'. The orientation and arcuate shape of the vanes improves sensitivity at low flow rates.

As indicated above, any of the nozzles 122, 122', 122'' can be installed in the notch 298*a* of the dividing wall 298. The nozzle to be installed is determined by the flow conditions at the installation site. With the disclosed construction, the nozzles can be easily changed or replaced at the installation site itself when the water flow conditions at the installation site are ascertained.

Although the invention has been described with a certain degree of particularity, it should be understood that those skilled in the art can make various changes to it without departing from the spirit or the scope of the invention as hereinafter claimed.

I claim:

1. In a control valve for controlling a water treatment apparatus, an improvement comprising:
   a) a water usage turbine rotatably mounted within a water receiving chamber, said turbine including a plurality of blades;
   b) a nozzle assembly having first and second flow paths for directing water in an impinging relationship with blades of said turbine;
   c) said first flow path including a fluid pressure responsive valve element for controlling fluid flow along said first flow path and configured such that said first flow path has a maximum flow rate that is greater than a maximum flow rate of said second flow path.

2. The improvement of claim 1, wherein said fluid pressure responsive valve element comprises a resiliently biased poppet.

3. The improvement of claim 2, wherein said poppet sealingly engageable with a seat defined by a housing forming part of said nozzle assembly.

4. The improvement of claim 3, wherein said poppet is responsive to a water induced pressure drop across said nozzle and is operative to open upon reaching a predetermined pressure drop to enable fluid flow along said one flow path.

5. The improvement of claim 3, wherein said seat is defined by the radiused entry surface that merges smoothly with a reverse radiused sealing surface that is sealingly engageable by said poppet.

6. The improvement of claim 5, wherein said seat is also defined by a reduced diameter portion sized to allow said poppet to disengage said seating surface and pass through said reduced diameter portion when a reverse pressure drop that exceeds a predetermined level is applied to said poppet.

7. The improvement of claim 5, wherein said poppet is biased towards engagement with said sealing surface by a spring.

8. The improvement of claim 3, wherein said nozzle includes a plurality of vanes located in a throat defined by said housing, said vanes imparting flow direction to water flowing through the nozzle.

9. The improvement of claim 3, wherein said poppet is supported for reciprocating movement by bearing structure forming part of said housing.

10. The improvement of claim 1, wherein said second flow path includes a fixed orifice, said fixed orifice increasing the velocity of water flowing along said other flow path in order to impinge on said blades of said turbine with greater effectiveness.

11. The improvement of claim 3, wherein said housing defines a sealing tongue which is engageable with structure in said control valve whereby a sealing interface is created while allowing said nozzle to be removably secured in said control valve.

12. The improvement of claim 11, wherein said nozzle further includes crush ribs for establishing a sealing interface between itself and housing structure forming part of said control valve.

13. A control valve for controlling a water treatment apparatus, comprising:
   a) a water usage turbine rotatably mounted within a water receiving chamber, said turbine including a plurality of vanes;
   b) a nozzle mounted within said housing for directing water toward said turbine, said nozzle including an inlet communicating with said water receiving chamber;
   c) said nozzle defining a throat extending from said inlet and terminating in an arcuate outlet configured to conform to a periphery of said turbine; and,
   d) a plurality of vanes in said throat of said nozzle, said vanes being spaced apart and oriented at predetermined angles with respect to said turbine, such that said vanes impart direction to water flowing through said nozzle, such that said water tends to impinge on turbine blades in a normal direction.

14. The control valve of claim 13, wherein each vane is positioned at an angle that is different from the angle at which the other vanes are positioned.

15. The control valve of claim 14, where each vane is arcuate in cross section.

16. The control valve of claim 15, where two sets of vanes are formed in said nozzle with a support plate separating each set.

17. The control valve of claim 16, wherein said housing further defines a blocking wall in order to reduce the size of said inlet.

18. The control valve of claim 17, wherein said housing defines an arcuate side surface forming part of said throat which also tends to impart direction to the flow of water through said nozzle and which is operative to encourage the water to flow in a direction that tends to strike the blades of the turbine with greater effectiveness.

19. The control valve of claim 13, wherein said housing defines a second flow path including a fixed orifice for directing water ejected by said nozzle toward said turbine.

20. The control valve of claim 13, further including a pressure drop responsive poppet piston mounted in said throat for controlling fluid flow along said throat, said poppet piston opening to permit flow along said throat when a pressure drop across said poppet exceeds a predetermined value.

21. The control valve of claim 13, wherein said vanes define channels through which water flows, said channels being selectively blockable in order to reduce the effective cross-section of said throat.

22. The control valve of claim 13 wherein said nozzle is replaceably held in said control valve and includes structure for providing sealing engagement with structure forming part of said housing.

23. The control valve of claim 22 wherein said structure comprises a notch in a dividing wall.

24. In a control valve for controlling a water treatment apparatus, an improvement comprising:
   a) a water usage turbine rotatably mounted within a water receiving chamber, said turbine including a plurality of blades;
   b) a nozzle assembly having first and second flow paths for directing water in an impinging relationship with blades of said turbine;
   c) at least one of said flow paths including a fluid pressure responsive valve element comprising a resiliently biased poppet for controlling fluid flow along its associated fluid path, said poppet sealingly engageable with a seat defined by a housing forming part of aid nozzle assembly; and
   d) said nozzle including a plurality of vanes located in a throat defined by said housing, said vanes imparting flow direction to water flowing through the nozzle.

* * * * *